June 26, 1951      W. L. ROBERTS      2,558,102
ARC WELDING SYSTEM
Filed June 11, 1949
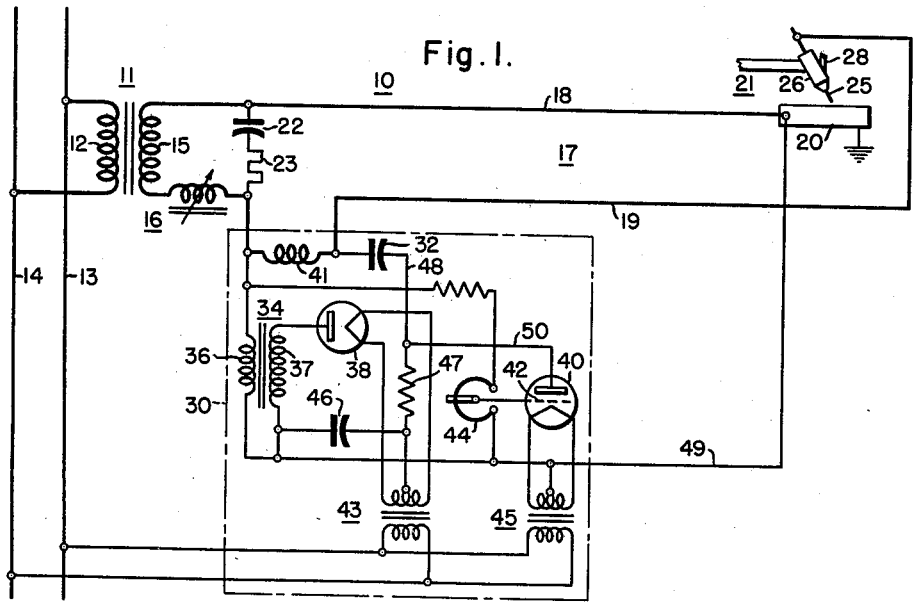
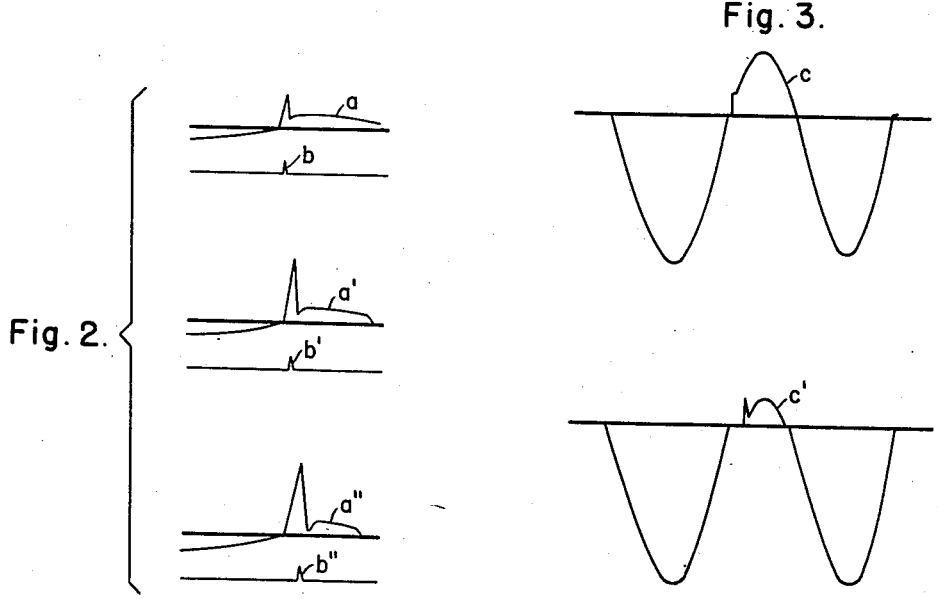
WITNESSES:
Robert C. Baird
F. V. Giolma
INVENTOR
William L. Roberts.
BY G. M. Crawford
ATTORNEY Patented June 26, 1951

2,558,102

UNITED STATES PATENT OFFICE 2,558,102

ARC WELDING SYSTEM

William L. Roberts, Pittsburgh, Pa., assignor to Westinghouse Electric Corporation, East Pittsburgh, Pa., a corporation of Pennsylvania Application June 11, 1949, Serial No. 98,536

14 Claims. (Cl. 315—246)

My invention relates, generally, to arc welding systems, and it has reference, in particular, to arc initiating and/or stabilizing systems disposed to be used with arc welding systems for initiating and/or stabilizing an arc therein.

Generally stated, it is an object of my invention to provide an arc initiating and/or stabilizing system which is simple and inexpensive to manufacture, and which is reliable and effective in operation.

More specifically, it is an object of my invention to provide, in an arc welding system, for applying to the arc welding circuit which is disposed to be energized from a relatively low voltage continuous current source, separate and discrete impulses at relatively widely spaced intervals of time, to initiate and/or stabilize an arc therein.

Another object of my invention is to provide, in an arc initiating and/or stabilizing system, for producing only a single arc initiating and/or stabilizing impulse in each cycle of a relatively low frequency source of alternating current.

Yet another object of my invention is to provide, in an arc stabilizing and/or initiating system, for producing a single arc initiating and/or stabilizing impulse in each cycle of a sixty-cycle source of alternating current, in adjustable phase relation with the alternating current.

It is an important object of my invention to provide, in an arc welding initiating and/or stabilizing system, for utilizing the voltage of the arc welding circuit to trigger an impulse generator once in each cycle of a sixty-cycle source.

Another important object of my invention is to provide, in an arc welding system wherein the arc circuit has asymmetric conducting characteristics, for utilizing an initiating and/or stabilizing system in which the phase relation of the stablizing impulses may be varied relative to the voltage of the arc welding circuit with which the stabilizing system is to be used, so as to vary the characteristics of the arc welding current over a wide range—from an alternating current to substantially a direct current.

It is also an important object of my invention to provide, in an arc initiating and/or stabilizing system, for supplying electrical energy to an energy storage device from an arc welding circuit for producing arc initiating and/or stabilizing impulses so that the impulses will be reduced in value when the arc is initiated.

Other objects will, in part, be obvious and will, in part, be explained hereinafter.

For a more complete understanding of the nature and scope of my invention, reference may be made to the following detailed description, which may be read in connection with the accompanying drawing, in which:

Figure 1 is a diagrammatic view of an arc welding system embodying the invention in one of its forms;

Fig. 2 shows reproductions of oscillograms illustrating variations in the phase relation of the impulses relative to the voltage of the arc welding circuit; and Figs. 3 and 4 are reproductions of oscillograms showing variations in the current wave form produced by varying the phase relation of the impulses with respect to the voltage of an arc welding circuit which has asymmetric conducting characteristics.

Referring to Figure 1, the reference numeral 10 may denote, generally, an arc welding system wherein a welding transformer 11 having a primary winding 12 connected by means of conductors 13 and 14 to a source of alternating current, has its secondary winding 15 connected through a variable reactor 16 to an arc welding circuit 17, including conductors or leads 18 and 19 which may be connected to a workpiece 20 and an electrode holder in the form of a welding torch 21, respectively. An arc stabilizing capacitor 22 may be connected across the arc welding circuit 17 in series circuit relation with a damping resistor 23.

The welding torch 21 is represented as comprising a non-consumable electrode 25 of tungsten or the like, which is surrounded by a hollow nozzle 26 to which an inert gas, such as helium or argon may be supplied by means of a conduit 28, for providing an inert gaseous shield about an arc which may be maintained between the electrode 25 and the work 20 upon which a welding operation is to be performed.

While the torch 21 is shown for the purpose of illustration as being of the inert gaseous atmosphere type, and the source of welding current is represented by an alternating-current source, it will be understood that the invention is not intended to be restricted to such apparatus, and may be used with other types of torches or electrode holders, and with different sources of welding current.

In order to provide for readily initiating an arc between the electrode 25 and the work 20, and for stabilizing such arc after it has been initiated so as to maintain a substantially continuous arc, an arc stabilizing system designated, generally, by the numeral 30 and comprising equipment contained within the dot-dash enclosure may be utilized. The initiating and/or stabilizing system 30 may, for example, comprise an impulse generator including a capacitor 32 which may be supplied with electrical energy and discharged to produce impulses in the welding circuit 17.

To produce a sufficiently high voltage for charging the capacitor 32, a step-up transformer 34 may be provided, having a primary winding 36 disposed to be connected across the arc welding circuit 17, and a secondary winding 37 disposed to be connected to the capacitor 32 through a rectifier valve device 38. The transformer 34 and the valve device 38 may be so connected as to provide for charging the capacitor 32 during half cycles when the electrode 25 is of a negative polarity.

In order to produce a single impulse in the arc welding circuit 17 at predetermined intervals of time, for example, once during each cycle of the alternating current, valve means such as the arc discharge device 40 may be provided for connecting the capacitor 32 to provide a discharge circuit therefor, through an inductance device 41, which may be connected in series circuit relation with the arc welding circuit 17.

In order to provide for rendering the valve device 40 conductive during the half cycles when the welding electrode 25 is positive, the control electrode 42 of the valve device 40 may be connected to the welding circuit 17 so as to provide a control electrode voltage which will be in opposed phase relation to the voltage applied to the capacitor 32 by the transformer 34.

The control electrode 42 may, for example, be connected by means of a potentiometer 44 across the primary winding 36 of the transformer 34 so that the voltage applied to the control electrode 42 may be varied in magnitude relative to the voltage of the arc welding circuit, whereby the phase relation of the periods of conductivity of the valve device 40 may be varied relative to the voltage of the arc welding circuit.

Filament transformers 43 and 45 may be utilized in connection with the valve devices 38 and 40. A capacitor 46 may be provided to protect the filament transformer against breakdown from the discharge impulses of the capacitor 32. A current limiting resistor 47 may be connected in circuit relation with the valve device 38 and the capacitor 32.

In operation, with an open circuit existing between the welding electrode 25 and the work 20, a relatively high open circuit voltage of about 65 volts may exist between the electrode and the work. This voltage will be multiplied by the step-up transformer 34 so that the capacitor 32 will be charged to a relatively high voltage through the rectifier valve device 38 during each negative half cycle of the voltage of the arc welding circuit. The charging circuit extends from the secondary winding 37 through the valve device 38, filament transformer 43, current limiting resistor 47, conductor 48, capacitor 32, inductance device 41, reactor 16, secondary winding 15, conductor 18 and conductor 49, back to the winding 37. During this half cycle, the control electrode 42 of the valve device 40 will be negative with respect to its cathode, thus holding the valve device in a non-conductive condition.

On the following half cycle of the arc welding circuit voltage, the rectifier device 38 ceases to conduct, and the control electrode 42 of the valve device 40 becomes positive. As soon as the voltage on the control electrode 42 reaches a critical value, the valve device 40 becomes conductive and provides a discharge circuit for the capacitor 32 extending from the right-hand side of the capacitor through conductor 48, conductor 50, valve device 40, conductor 49 to ground at the work 20 through conductor 18, capacitor 22 and resistor 23 in parallel circuit relation with the secondary winding 15 and reactor 16, and inductance device 41, back to the other side of the capacitor.

This discharge produces in the arc welding circuit 17 a voltage which ionizes the gap between the electrode and the work when the electrode is brought into proximity with the work, permitting the sixty-cycle welding current from the secondary winding 15 of the welding transformer to flow through the welding circuit. As soon as an arc is established between the electrode 25 and the work 22, the voltage of the welding circuit 17 will be reduced substantially to the value of the arc voltage.

Accordingly, the voltage applied to the capacitor 32 will be reduced, thus reducing the amplitude of the impulses produced by the stabilizer 30. The discharge circuit of the capacitor 32 will now be principally from the work 20, across to the electrode 25, and to the other side of the capacitor through conductor 19, because of the relatively low impedance of the arc.

The characteristics of the arc current may be varied, either by changing the slope of the voltage peak in the arc circuit, or by changing the phase relation of the impulses relative to the voltage wave. The slope of the peaks may be changed by changing the value of the capacitor 22, which changes the point in the cycle when the grid voltage of the valve device reaches the critical value at which the device conducts.

By varying the operating position of the potentiometer 44, the value of the control electrode voltage may be varied relative to the voltage of the arc welding circuit, and, in conjunction with an asymmetric conducting circuit such as the arc welding circuit 17, the character of the positive half cycles of conduction may be varied. This variation is illustrated in the three sets of curves shown in Fig. 2 wherein the curves, $a$, $a'$, and $a''$ represent the voltage of the arc welding circuit, and the curves $b$, $b'$ and $b''$ represent the impulses produced by the stabilizer 30.

By successively delaying the occurrence of the peaks of impulses $b$, $b'$ and $b''$, the amplitudes of the positive half cycles of the welding current may be successively reduced such, for example, as illustrated in Figs. 3 and 4, wherein the curves $c$ and $c'$ show decreasing values of the positive loops of welding current for increasing amounts of delay in the rendering of the valve device 40 conductive, which delay may be obtained by decreasing the value of the control electrode voltage relative to that of the arc welding circuit. In an asymmetric conducting circuit such as the arc welding circuit 17, the characteristics of the arc current may be varied from almost a sine wave to almost direct current, by thus varying the phase relation of the impulses.

From the above description and the accompanying drawing, it will be apparent that I have provided in a simple and effective manner for initiating and/or stabilizing the arc in an arc welding system. By utilizing a capacitor which receives its energy from the arc welding circuit for producing the initiating and/or stabilizing impulses, it is possible to provide a stabilizer in which the initial impulse when the arc is first struck will be of greater amplitude than subsequent impulses. This facilitates greatly in reducing the duty cycle on the initiating and stabilizing equipment, increasing the service life thereof, since by far the greater portion of the operating time will be during welding, when the stabilizing impulses need not be so high as is initially necessary for initiating an arc. When an arc stabilizing system embodying the features of my invention is used in connection with an inert gaseous atmosphere arc welding system, which has asymmetric conducting qualities, the characteristics of the welding current may be varied from substantially a sine wave to substantially direct current, by varying the phase relation of the impulses relative to the voltage of the arc welding circuit. By utilizing separate and discrete impulses at predetermined spaced intervals of time, the amount of energy is kept to a minimum, and interference is reduced to a relatively low value.

Since certain changes may be made in the above-described construction, and different embodiments of the invention may be made without departing from the spirit and scope thereof, it is intended that all the matter contained in the above description, and shown in the accompanying drawing, shall be considered illustrative, and not in a limiting sense.

I claim as my invention:

1. In a stabilizing system for use with an arc circuit in which an arc is to be produced, an energy storage device, circuit means connecting the energy storage device to receive electrical energy from the arc circuit, and additional circuit means including a valve device connected to provide a discharge circuit for the energy storage device at predetermined timed intervals to produce impulses in the arc circuit.

2. In combination with an arc circuit, a capacitor, circuit means connecting the capacitor to the arc circuit for receiving electrical energy therefrom, and additional circuit means connected to provide a separate discharge circuit for the capacitor which discharge circuit is coupled with the arc circuit.

3. In combination with an arc welding circuit, an energy storage device, circuit means including a rectifier device connected to charge the energy storage device in accordance with the voltage of the arc welding circuit, and additional circuit means including a valve device responsive to the voltage of the arc welding circuit connected to provide a discharge circuit for the energy storage device to produce an impulse in the arc welding circuit.

4. In an arc initiating system for use with an arc welding circuit, energy storage means, circuit means connected to the arc welding circuit to supply electrical energy to the energy storage means, and control means associated with an alternating-current source connected to provide a discharge circuit for the energy storage means to produce a single impulse in the arc welding circuit in each cycle of the alternating-current source.

5. The combination with an arc welding circuit disposed to be connected to a source, of an energy storage device, circuit means connecting the energy storage device for charging it in accordance with the voltage of the arc welding circuit, and additional circuit means including a valve device connected to provide a discharge circuit coupled with the arc welding circuit.

6. In combination with an arc welding circuit wherein alternating current is supplied to a tungsten electrode for maintaining an arc in an inert gaseous atmosphere, a capacitor, rectifier means connecting the condenser to the arc welding circuit for charging on one-half cycle, and valve means connected to provide a discharge circuit for the capacitor in the next half cycle to produce an impulse in the welding circuit.

7. In an arc welding system, an arc welding circuit disposed to be connected to an alternating-current source, a capacitor, circuit means including a step-up transformer and a rectifier device connected to the source to charge the capacitor on negative half cycle of the source, and valve means having a control electrode energized in opposed phase relation with the periods of conductivity of the rectifier device, said valve means being disposed to provide a discharge circuit for the capacitor coupled with the arc welding circuit.

8. In an arc stabilizing system for use with an arc welding circuit disposed to be energized from a source, a capacitor, circuit means including a step-up transformer and a rectifier device connected in circuit relation with the capacitor to supply electrical energy to the capacitor, and valve means connecting the capacitor to the arc welding circuit to produce impulses therein at predetermined spaced intervals of time.

9. In an arc initiating system for use with an alternating-current arc welding circuit, a capacitor, circuit means connecting the capacitor to be charged during negative half cycles of the arc welding circuit, additional circuit means connected to provide a discharge circuit for the capacitor, said additional circuit means being connected with the arc welding circuit and including a valve device having a control electrode, and control means operable to apply a variable control voltage from the arc welding circuit to the control electrode.

10. An arc welding system comprising, an arc welding circuit disposed to be connected to a source of alternating current, a capacitor, circuit means including a step-up transformer and a rectifier device connected to supply electrical energy to the capacitor from the source during one-half cycle of the source voltage wave, and valve means having a control electrode disposed to be energized to render the valve device conductive during the next half cycle of the source voltage wave, said valve device being connected to discharge the capacitor through the arc circuit.

11. In an arc initiating system for use with an asymmetric conducting arc welding circuit disposed to maintain an alternating-current arc, a capacitor, circuit means including a step-up transformer energized from the arc welding circuit and a rectifier device connected to charge the capacitor during negative half cycles of the arc welding circuit voltage, circuit means including an electrode controlled valve device providing a discharge circuit for the capacitor during positive half cycles, and control means operable to vary the phase relation of the discharge relative to the voltage of the arc welding circuit.

12. In combination with an arc welding circuit having a shunt circuit including a capacitor and a resistance device connected across the circuit between the arc and a source of alternating current, a capacitor, circuit means connected to supply electrical energy to the capacitor, inductance means disposed to be connected in series circuit relation with the arc welding circuit between the shunt circuit and the arc, and valve means connected to provide a discharge circuit for the capacitor through said inductance means.

13. In combination, an arc welding circuit disposed to be connected to a source of alternating current for maintaining an alternating-current arc therein, a shunt circuit including a capacitor and a resistor connected across the circuit between the source and the arc, inductance means connected in series circuit relation with the circuit between the shunt circuit and the arc, and control means disposed to provide a current impulse through the inductance means once in each cycle of the alternating current source.

14. In combination with an arc welding circuit disposed to be supplied with alternating current to maintain an alternating-current arc therein, a capacitor, circuit means connecting the capacitor to a source of electrical energy, valve means connected to provide a discharge circuit for the capacitor to produce an impulse in the arc welding circuit, said valve means having a control electrode, and circuit means including a voltage divider operable to apply to the control electrode an alternating-current control voltage variable with respect to the voltage of the arc welding circuit.

WILLIAM L. ROBERTS.

REFERENCES CITED

The following references are of record in the file of this patent:

UNITED STATES PATENTS

| Number | Name | Date |
|---|---|---|
| 1,982,327 | Smith | Nov. 27, 1934 |
| 2,231,674 | Ludwig | Feb. 11, 1941 |
| 2,235,385 | Rava | Mar. 18, 1941 |
| 2,417,489 | Hasler et al. | Mar. 18, 1947 |